Dec. 6, 1960     R. H. HALLMAN     2,962,971
POWER TRANSMISSION
Filed July 2, 1956

*INVENTOR.*
RUSSELL H. HALLMAN
BY
ATTORNEYS

United States Patent Office 2,962,971
Patented Dec. 6, 1960

2,962,971

POWER TRANSMISSION

Russell H. Hallman, Royal Oak, Mich., assignor to Vickers Incorporated, Detroit, Mich., a corporation of Michigan Filed July 2, 1956, Ser. No. 595,333

4 Claims. (Cl. 103—42)

This invention relates to power transmissions, and is particularly applicable to those of the type comprising two or more fluid pressure energy translating devices, one of which may function as a pump and another as a fluid motor.

More particularly the invention relates to a flow control system for such a transmission in which the pump is driven by a variable speed prime mover, such as the engine of a motor vehicle.

In such transmissions the fluid actuated accessories often require as high a rate of fluid supply during engine idle periods as during high speed engine operation. For example, this is true in the case of a steering booster. Thus, where a constant displacement pump directly driven from the vehicle engine is utilized, the pump discharge flow rate at engine idle must be sufficiently high for satisfactory accessory operation. As engine speed increases, so also does the discharge rate of the pumping mechanism. In the usual motor vehicle, the ratio of engine idle speed to top speed is approximately one to ten. Thus, there is an over-supply of fluid at all times when engine speeds are substantially above idle. Where precise control is required, as in steering, this variable over-supply presents a serious problem.

The prior art has attacked the problem of fluid over-supply to the load by providing spill-over, or by-pass, type flow controls in the system. The usual arrangement has a by-pass valve at the pump outlet which is spring biased to a closed position in which all fluid pumped goes to the load. A restriction to fluid flow in the motor line creates a pressure differential which is proportional to the flow rate to the work and this differential is utilized to control the by-pass valve. When flow to the work reaches a certain desired magnitude, the pressure differential overcomes the valve spring and causes the by-pass valve to shift and thus divert pumped fluid away from the work and back to the reservoir. When the cracking point of the by-pass valve has been reached, further increases in pumping rate result in greater opening of the valve and increased flow of by-pass fluid. Such a spill-over type valve is shown in Figure 1 of the patent to Amsler, No. 1,467,522.

The above described arrangement has been quite satisfactory but has one important disadvantage. This disadvantage results largely from the rate characteristics of the biasing springs used in the by-pass valve and the velocity effect of the by-passed fluid on the valve spool. Due to the spring rate and velocity effect, an increasing pressure differential is required to move the by-pass valve from the cracking position to the wide open position. Since the valve actuating pressure differential is proportional to flow rate to the work, flow rate to the work must increase as the valve moves from cracking to wide open. The consequent increase in flow rate to the work resulting from variations in pump speed above the valve cracking point is of substantial magnitude and has been found detrimental to precise control in such applications as steering systems.

Further, extremely high pump speeds are normally associated with high vehicle speeds. Since at high vehicle speeds the rate of maneuvering is of necessity limited, a high rate of supply to the steering booster is not required. If the high or increasing supply rate is continued, it results in waste of power and excessive heating of the oil.

It is, therefore, an object of the present invention to provide an improved flow rate control system wherein power can be conserved and operating temperatures reduced by slightly lowering the flow rate to the booster during high speed vehicle operation.

It is also an object of this invention to provide such a system incorporated in low cost pumping structure.

Further objects and advantages of the present invention will be apparent from the following description, reference being had to the accompanying drawing wherein a preferred form of the present invention is clearly shown.

Figure 4:
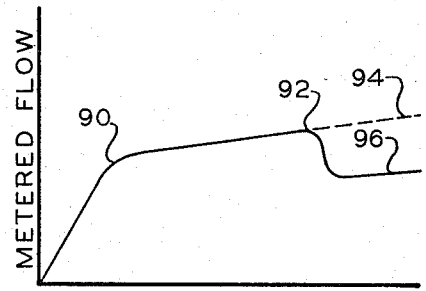

Figure 4 compares actual performance curves of a pump and flow control valve embodying the present invention and a conventional pump and flow control valve.

Figure 3:
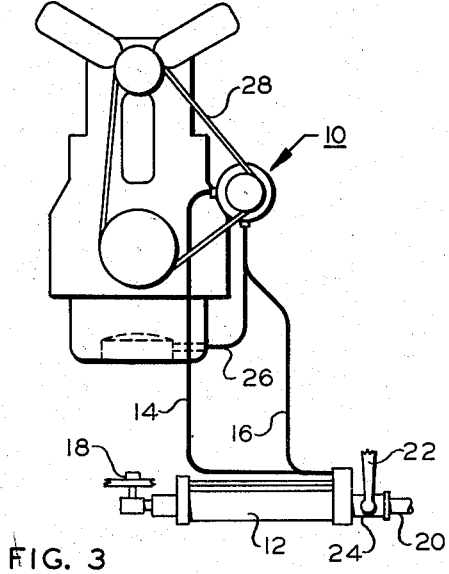
Figure 3 illustrates such an improved power transmission as it might be installed in a particular motor vehicle.

Referring first to Figure 3, a pump, generally designated 10, is connected to a steering booster 12 by a delivery conduit 14, and a return conduit 16. Steering booster 12 may be of the type illustrated in U.S. Patent No. 2,022,698 to H. F. Vickers. Such a booster may be affixed to a vehicle frame at 18, and connected to the drag link 20 of the steering mechanism. Control of the booster is effected through the vehicle pitman arm 22, which is connected to the usual open center control valve inside the valve body 24 to actuate the steering motor. Replenishing fluid may be supplied to the pump inlet through a conduit 26, leading from the engine oil pump. Such an arrangement also provides a positive pump inlet pressure. Pump 10 is illustrated as being driven by vehicle engine fan belt 28.

Figure 1:
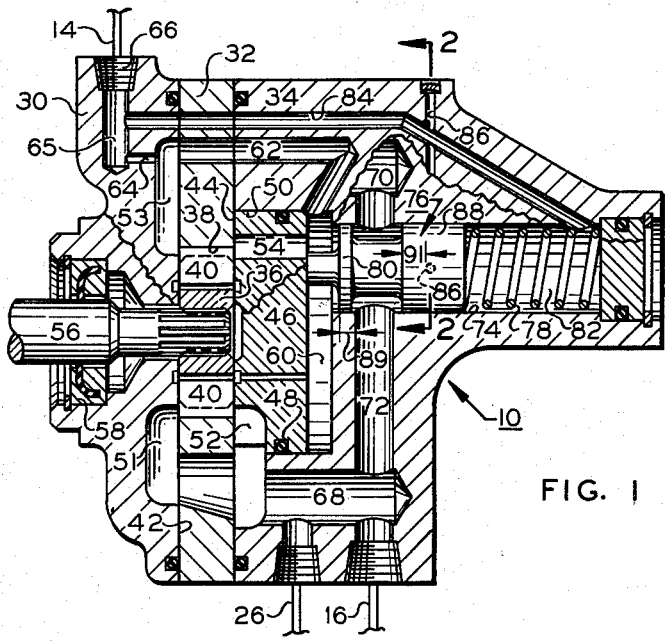
Figure 1 illustrates a power transmission embodying the present invention and includes a cross-sectional view of the pumping structure.

The pump 10 includes a body member 30, a ring or stator member 32, and a head member 34. A rotor 36 is telescopically disposed in an elliptically shaped bore 38 in ring 32. Radially slideable vanes 40 extend from the rotor 36 to engage the elliptical bore 38, and the in-and-out movement of the vanes produces the pumping action. The ring 32, rotor 36, and the vanes 40 are axially sandwiched between a face 42 of the body 30 and a face 44 of a pressure plate 46. O-ring seal 48 located in the periphery of pressure plate 46 engages bore 50 of head member 34 in a fluid sealing relation. Two pairs of inlet ports 51 and 52, only one pair of which is shown in Figure 1, communicate with the expanding intervane chambers and two pairs of discharge ports 53 and 54, only one pair of which is shown in Figure 1, communicate with the contracting intervane chambers. Rotor 36 is supported on and driven by a drive shaft 56, which is surrounded by a conventional shaft seal 58. Shaft 56 may be an extension of the vehicle generator shaft, or may be coupled to the vehicle engine in any suitable manner.

The pumping structure thus far described is conventional in nature and forms no part of the present invention. It is only important to note that the discharge from the pumping mechanism, except for that discharged directly into port 53, is manifolded in the pressure chamber 60 behind the pressure plate 46. Pressure chamber 60 communicates through a passage 62 with the discharge port 53. Discharge port 53 communicates across a metering orifice 64, with a discharge passage 65, and an external delivery connection port 66, to which is coupled the delivery conduit 14. It will thus be seen that the entire quantity of fluid which is discharged from the pump 10 to the servo valve in the steering booster 12 must pass over the metering orifice 64.

The pairs of inlet ports 51 and 52 are supplied with fluid by a pair of axial passages 68 and 70 in the head member 34. A transverse passage 72 establishes communication between passages 68 and 70. A valve bore 74 extends from the pressure chamber 60 into head member 34 to intersect the transverse passage 72. A flow control valve generally designated 76 is slideably disposed in the bore 74 and is biased by a spring 78 to a position such that the valve land 80 blocks communication between the pressure chamber 60 and the transverse passage 72.

Spool 76 has equal and opposed areas exposed to pressure in pressure chamber 60 and in the valve spring chamber 82. A pressure sensing passage 84 extends from a point downstream of the metering orifice 64 to the spring chamber 82. A transverse drilled passage 86 connects sensing passage 84 to bore 74 at a point so located axially in bore 74 that when the flow control valve 76 is in the closed position the valve spool 88 blocks passage 86. Valve 76 isolates chamber 60 from passage 72 by an overlap indicated at 89 and isolates passage 86 from passage 72 by a larger overlap indicated at 91. These varying amounts of overlap insure that, as valve 76 shifts rightward, first chamber 60 and then passage 86 will be connected to passage 72.

In the low speed ranges of the vehicle engine, spring 78 maintains the valve spool 88 in the position illustrated. As the vehicle engine speed increases, however, a point is reached at which the pressure drop across the metering orifice 64, acting on the opposed areas of spool 88, overcomes the spring 78 and shifts spool 88 to the right, establishing communication between pressure chamber 60 and the transverse passage 72.

As the pump discharge tends to exceed the cracking point of spool 88, additional quantities of fluid are by-passed from the pump discharge zones to the pump inlet zones. As pump speed increases further and spool 88 shifts further, the passage 86 will be uncovered providing an auxiliary by-pass passage. Further opening of spool 88 will divert increased amounts into the auxiliary by-pass passage, thus dropping the flow-rate to the booster 12.

Figure 2:
Figure 2 is a sectional view taken on line 2—2 of Figure 1.

An additional view of the transverse passage 86 illustrating the manner in which it connects passage 84 with bore 74 to form the auxiliary by-pass passage may be seen in Figure 2.

As can be seen in Figure 4, the metered flow of the pump increases directly with an increase in pump speed up to the point 90 when valve land 80 shifts to open initial by-pass path from pressure chamber 60 through bore 74 and into transverse passage 72. As pump speed increases further there is a slight but steady increase in metered flow delivery to the booster 12. At point 92, where pump speed exceeds a predetermined rate, the auxiliary by-pass fluid path from discharge passage 65, through passages 84 and 86, valve bore 74 and into transverse passage 72, will be opened. The resultant diminution of fluid flow to the steering booster 12 is illustrated by the portion 96 of the flow vs. speed curve. This may be contrasted to the steady rise fluid flow characteristic of the conventional combination of pump and flow control valve shown by the dotted extension 94 of the curve.

It can be seen from the foregoing that this invention has provided an improved flow control system for use with a pump driven by a variable speed prime mover, which system accurately controls flow to a utilization circuit and effects reduced flow rate to the load under high speed conditions thus saving power and lowering operating temperatures.

While the form of embodiment of the invention as herein disclosed constitutes a preferred form, it is to be understood that other forms might be adopted, all coming within the scope of the claims which follow.

What is claimed is as follows:

1. In combination with a pump driven by a variable speed prime mover, a flow regulating system comprising: delivery and inlet zones in said pump; a delivery passage extending from said delivery zones; flow restrictive means in said delivery passage; a pair of by-pass passages interconnecting said delivery and inlet zones, one of said passages connecting said delivery zones with said inlet zones upstream of said flow restrictive means, while the other passage connects the delivery zones with the said zones downstream of said flow restrictive means; flow control valve means normally closing both said by-pass passages; and means responsive to the pressure differential across said flow restrictive means for shifting said flow control valve to open first one and then the other of said by-pass passages, said means comprising a pair of opposed areas, one of said areas being exposed to pressure in said delivery passage upstream of said flow restrictive means and the other exposed to pressure in said delivery passage downstream of said flow restrictive means.

2. In combination with a pump driven by a variable speed prime mover, a flow regulating system comprising: delivery and inlet zones in said pump; a delivery passage extending from said delivery zones; flow restrictive means in said delivery passage; a pair of by-pass passages interconnecting said delivery and inlet zones, one of said passages connecting said delivery zones with said inlet zones upstream of said flow restrictive means, while the other passage connects the delivery zones with the said zones downstream of said flow restrictive means; a flow control valve normally closing both side by-pass passages with different amounts of overlap; and means responsive to the pressure differential across said flow restrictive means for shifting said flow control valve to open first one and then the other of said by-pass passages, said means comprising a pair of opposed areas, one of said areas being exposed to pressure in said delivery passage upstream of said flow restrictive means and the other exposed to pressure in said delivery passage downstream of said flow restrictive means.

3. In combination with a pump driven by a variable speed prime mover, a flow regulating system comprising: delivery and inlet zones in said pump; a delivery passage extending from said delivery zones; flow restrictive means in said delivery passage; a pair of by-pass passages interconnecting said delivery and inlet zone, one by-pass being of large capacity located upstream of said flow restrictive means and the other of relatively small capacity located downstream of said flow restrictive means; flow control valve means normally closing both said by-pass passages; and means responsive to the pressure differential across said flow restrictive means for shifting said flow control valve to open first said one and then said other of the by-pass passages, said means comprising a pair of opposed areas, one of said areas being exposed to pressure in said delivery passage upstream of said flow restrictive means and the other exposed to pressure in said delivery passage downstream of said flow restrictive means.

4. In combination with a pump driven by a variable speed prime mover, a flow regulating system comprising: delivery and inlet zones in said pump; a delivery passage extending from said delivery zones; flow restrictive means in said delivery passage; a pair of by-pass passages interconnecting said delivery and inlet zones, one by-pass being of large capacity located upstream of said flow restrictive means and the other of relatively small capacity located downstream of said flow restrictive means; a flow control valve normally closing both said by-pass passages with different amounts of overlap; and means responsive to the pressure differential across said flow restrictive means for shifting said flow control valve to open first said one and then said other of said by-pass passages, said means comprising a pair of opposed areas, one of said areas being exposed to pressure in said delivery passage upstream of said flow restrictive means and the other exposed to pressure in said delivery passage downstream of said flow restrictive means.

References Cited in the file of this patent

UNITED STATES PATENTS

| | | |
|---|---|---|
| 2,665,704 | Kanuch | Jan. 12, 1954 |
| 2,722,890 | Lucien | Nov. 8, 1955 |
| 2,737,196 | Eames | Mar. 6, 1956 |
| 2,746,392 | Klessig et al. | May 22, 1956 |
| 2,748,711 | Drude | June 15, 1956 |
| 2,752,853 | Eames | July 3, 1956 |
| 2,768,582 | Klessig et al. | Oct. 30, 1956 |
| 2,887,060 | Adams et al. | May 19, 1959 |

FOREIGN PATENTS

| | | |
|---|---|---|
| 559,108 | Great Britain | Feb. 4, 1944 |
| 1,108,743 | France | Sept. 14, 1955 |